Oct. 11, 1966     H. W. TEPPER     3,277,892
APPARATUS FOR CORRECTING TONGUE THRUST PROBLEMS
Filed Jan. 6, 1966     2 Sheets-Sheet 1
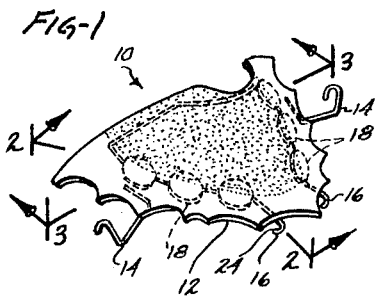
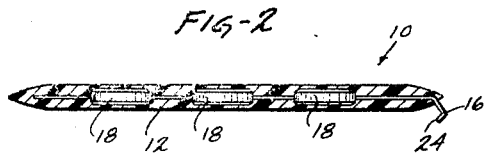
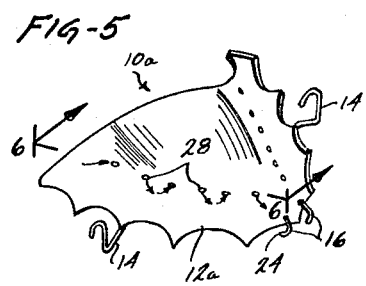
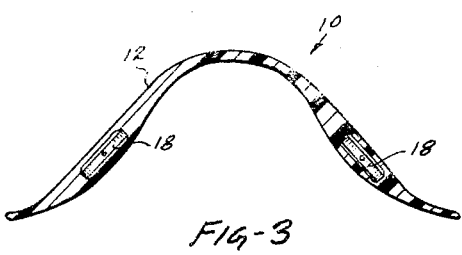
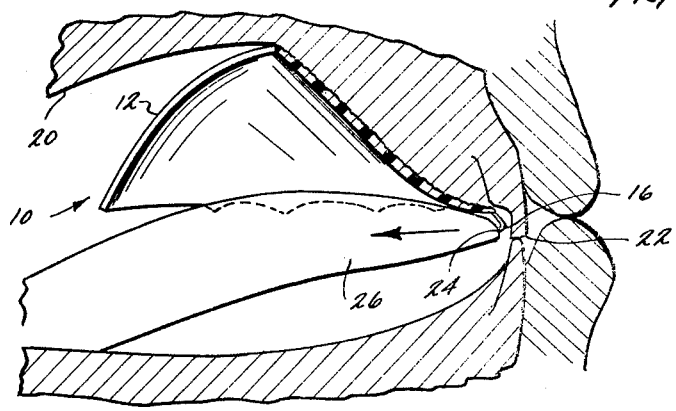
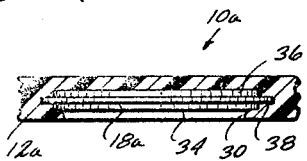
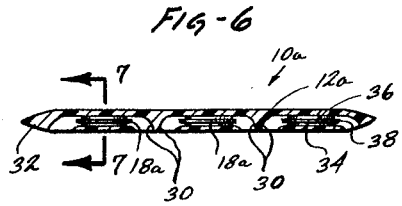
INVENTOR
HARRY WILLIAM TEPPER
ATTORNEYS

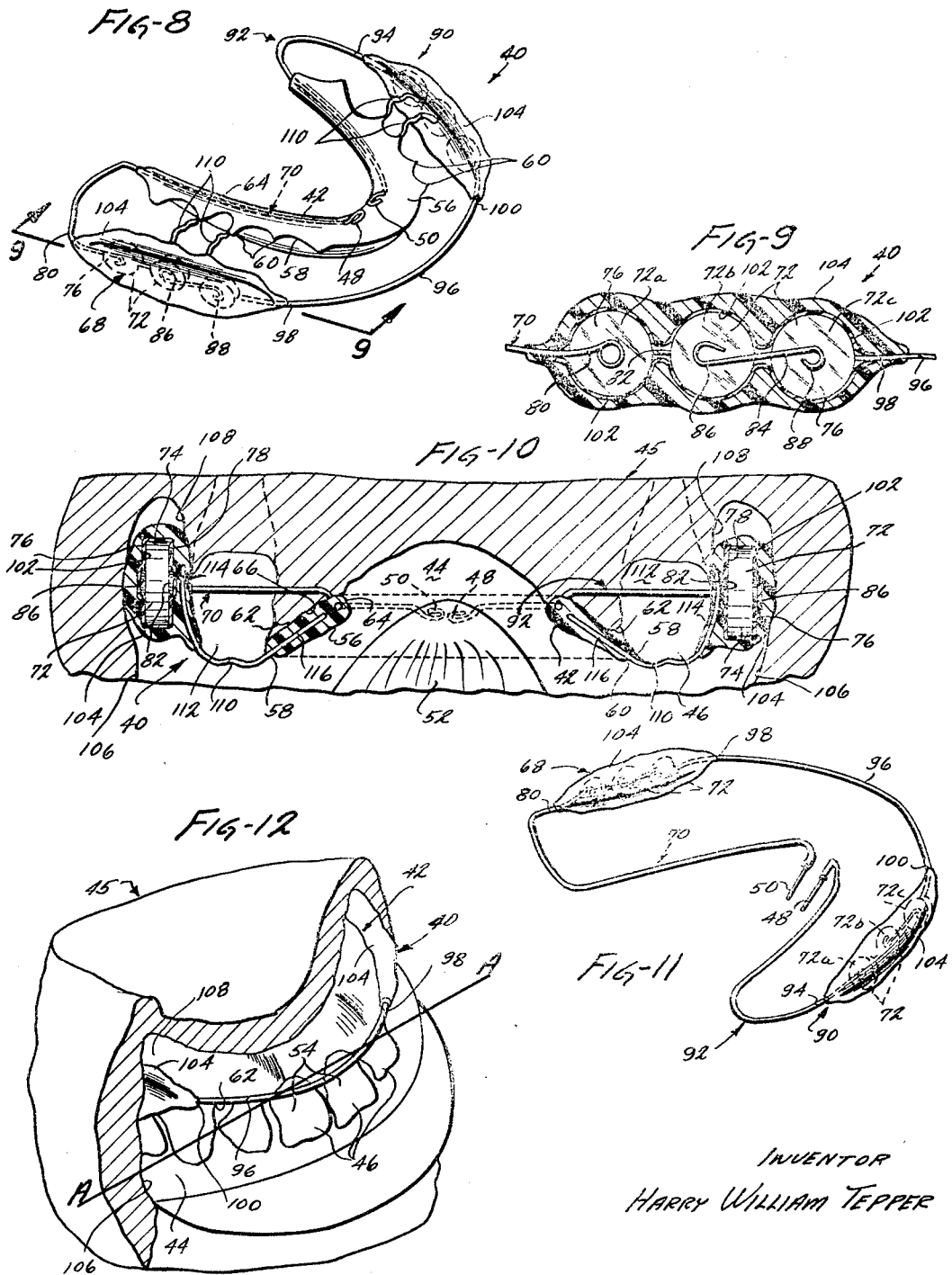

United States Patent Office 3,277,892
Patented Oct. 11, 1966

3,277,892
APPARATUS FOR CORRECTING TONGUE
THRUST PROBLEMS
Harry William Tepper, 11633 San Vicente Blvd.,
Los Angeles, Calif.
Filed Jan. 6, 1966, Ser. No. 519,121
10 Claims. (Cl. 128—172.1)

This application is a continuation-in-part of a copending application which was filed June 17, 1964 under Serial No. 375,712. The present invention relates to an apparatus for correcting tongue thrust problems, and more particularly to such an apparatus which imparts an electrical stimulus to a patient's tongue when it is thrust forward incorrectly.

As used herein, the term "patient" shall be taken to mean both a human patient and an animal patient.

Many babies learn to swallow incorrectly by thrusting their tongues forward instead of drawing them back and moving them toward the top of the palate. This develops a habit which is not broken as the child matures, with the result that the child does not swallow correctly, but insists upon thrusting his tongue forward between the biting edges of his teeth. This not only sometimes causes the child to develop a defective speech pattern, but also is detrimental to the formation of his dental arches which support his teeth because the constant pushing on the teeth and mucosa by the tongue can cause his dental arches to become deformed.

In addition, many children develop the incorrect habit of permitting the tongue normally to rest against the lingual surfaces of the upper incisors. This too causes the dental arches to become deformed, and results in malocclusion.

Also, some thoroughbred colts develop the habit of elevating their tongues in such a manner that they do not breathe correctly. When such colts attain the proper age for racing, they will not develop into satisfactory race horses if this habit is not broken.

In view of the foregoing, it is a primary object of the present invention to provide a new and useful apparatus for correcting tongue thrust problems and malocclusions, and for preventing malocclusions.

It is another object of the present invention to provide a new and useful device for producing electrical stimuli to correct tongue thrust problems and malocclusions.

Yet another object of the present invention is to provide a new and useful device of the type described which will correct a patient's habit of normally resting his tongue on the lingual surfaces of his central incisors.

A further object of the present invention is to provide a new and useful palate retainer which includes electrode means for imparting electrical stimuli to the tip of a patient's tongue when it is moved forward to approximately the lingual surface of his upper incisors.

A still further object of the present invention is to provide a new and useful device for training a thoroughbred colt to maintain his tongue in a proper position for satisfactory breathing.

According to the present invention, a suitable support means, such as a full palate retainer, of the Hawley type, is provided with means for imparting a suitable electrical stimulus to the tip of a patient's tongue when it is thrust forward to within approximately two millimeters of the lingual surfaces of the upper incisors.

In one form of the invention, the electrical stimulus is provided by embedding six conventional 1.4-volt batteries in the palate retainer and connecting them in series with a pair of electrodes which are also embedded in the palate retainer.

In a first modified form of the invention, saliva in the mouth of the user of the device acts as an electrolyte for battery plates mounted in the palate retainer. Six sets (cells) of battery plates are employed and are connected to the electrodes in series.

In a second modified form of the invention, the full palate retainer is replaced by support means which not only supports the electrodes but also includes means for helping a patient overcome improper lip and cheek functioning.

In the first two forms of the invention, the electrodes are mounted on the support means in such a manner that, when the support means is in position in the patient's mouth, each electrode is located approximately one millimeter from the lingual surface of an associated upper central incisor and extends from the lingual-gingival line incisally to approximately the middle one-third of the lingual surface of an associated central incisor. The tips of the electrodes preferably project toward the tip of the tongue about two millimeters. In the third form of the present invention, the electrodes may be located at any suitable position adjacent the patient's upper teeth when it is desired to correct improper tongue functioning.

When the patient's tongue is thrust forward sufficiently during swallowing to contact the electrodes, a circuit is completed and an electrical stimulus or shock is imparted to the tongue, causing the patient to draw it back and move it toward the top of his palate in normal manner. An electrical stimulus may also be imparted to the tongue when it is caused to function incorrectly in other ways, depending on the location of the electrodes.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which like reference characters refer to like elements in the several views.

In the drawings:

FIG. 1 is a perspective view of a first embodiment of an apparatus of the present invention;

FIG. 2 is an enlarged, cross-sectional view taken along line 2—2 of FIG. 1;

FIG. 3 is an enlarged, cross-sectional view taken along line 3—3 of FIG. 1;

FIG. 4 is a somewhat schematic, cross-sectional view showing the device of FIG. 1 in position in a patient's mouth;

FIG. 5 is a perspective view of a modified form of the apparatus shown in FIG. 1;

FIG. 6 is an enlarged, cross-sectional view taken along line 6—6 of FIG. 5;

FIG. 7 is an enlarged, partial cross-sectional view taken along line 7—7 of FIG. 6;

FIG. 8 is a perspective view of a second embodiment of an apparatus of the present invention;

FIG. 9 is an enlarged, partial cross-sectional view taken along line 9—9 of FIG. 8;

FIG. 10 is an enlarged cross-sectional view showing somewhat schematically the device of FIG. 8 in position in a patient's mouth;

FIG. 11 is an enlarged, perspective view of an electric potential, electrode and circuit means used in the device of FIG. 8; and FIG. 12 is an enlarged, partial perspective view of the device in position in a patient's mouth.

Referring again to the drawings, and particularly to FIGS. 1–3, an apparatus of the present invention, generally designated 10, includes a full palate retainer 12 which may be of the Hawley type. The retainer 12 is made by taking impressions of the patient's palate, and making a mold in conventional manner. The retainer 12 may be retained in position in a patient's mouth by suitable clasps, such as the ones shown at 14, which are embedded in the retainer 12. A pair of spaced electrodes 16 also are embedded in the retainer 12 and are connected in a series circuit with a suitable number of cells, such as the six shown at 18. The cells are preferably wafer-thin, are embedded in the retainer 12, and place on electrical potential of approximately 9 volts across the electrodes 16.

The retainer 12 may be made from any suitable dental plastic, as will be readily understood by those skilled in the art, and is placed in position against the palate 20 of a patient's mouth. When so positioned, the electrodes 16 preferably located approximately one millimeter from the lingual surface of an associated upper central incisor 22. The electrodes 16 extend in the direction of the lingual-gingival line incisally to approximately the middle one-third of the lingual surface of the associated central incisor 22.

The tips 24 of the electrodes 16 are preferably somewhat spherically shaped to minimize irritation to the patient's tongue 26 and project toward the tip of the tongue 26 about two millimeters from the asosciated central incisor 22. When the tongue 26 is thrust forward, it will contact the tips 24 of the electrodes 16 completing a circuit through the batteries 18. This causes an electrical stimulus to be imparted to the tongue 26 causing the patient to involuntarily draw his tongue back and move it toward the top of his palate 20.

It has been found that electrical stimuli are quite effective in breaking the habit of thrusting the tongue forward in swallowing with the result that the patient subconsciously develops the correct tongue motion of thrusting the tongue back toward the top of the palate 20 in swallowing. Likewise, electrical stimuli are equally effective in breaking a patient's habit of letting the tip of his tongue rest against the lingual surface of his upper incisor 22. Thus, the device 10 can be positioned in a race horse's mouth and used to teach him to keep his tongue down in a proper position for good breathing.

A modification of the apparatus constituting the first embodiment of the present invention as shown in FIGS. 5–7, wherein a modified apparatus 10a includes a full palate retainer 12a which includes clasps 14 and electrodes 16 which may be identical with those shown in FIGS. 1–3. The palate retainer 12a is modified from that shown in FIG. 1 to include apertures 28 through which the patient's saliva is free to flow. The cells 18a employed in conjunction with the retainer 12a may be activated by the patient's saliva and are mounted in recesses 30 which are provided in the lower surface 32 of the remainer 12a. The recesses 30 communicate with the apertures 28 so that the patient's saliva is free to flow in and around the batteries 18a. Each battery 18a includes a suitable zinc plate 34 and a silver plate 36 (or copper, or other combinations of metal plates with sufficient difference of electrical potential) which may be separated with a light wooden separator 38. The electrodes 16 are connected in a series circuit, not shown, with the cells 18a in such a manner that a suitable potential exists across the electrodes 16 to impart electrical stimuli to the tongue 26 when it comes into contact with the electrodes 16. The cells 18a are preferably wafer-thin so that they will readily adapt themselves to various palates.

Referring now to FIGS. 8–11, a device constituting a second embodiment of the present invention, generally designated 40, includes a support means 42 which is positionable in the mouth 44 of a patient 45 adjacent the patient's upper teeth 46 for supporting a pair of electrode means 48, 50 adjacent the upper teeth 46. The electrode means 48, 50 imparts an electrical shock to the tongue 52 of the patient 45 when the tongue 52 is moved to a predetermined, improper position within the mouth 44 adjacent the upper teeth 46. This improper position is shown herein for purposes of illustration, but not of limitation, as being located immediately behind the upper, central incisors 54 in a plane A—A lying parallel to and slightly above the occlusial plane of the upper teeth 46. It will, of course, be apparent to those skilled in the art that the electrode means 48, 50 may be supported at many other improper positions, depending upon the location of the electrode means 48, 50 on the support means 42. For example, the patient may have the habit of resting his tongue against one of his upper molars. Electrode means 48, 50 could then be mounted in the support means 42 in such a manner that the electrode means 48, 50 would be immediately adjacent the molar when the support means 42 is in position in the patient's mouth 44.

The support means 42 includes a substantially U-shaped member 56 including a scalloped edge 58 having a plurality of projections 60 engageable between the upper teeth 46 along the patient's gingival line 62. The member 56 also includes an inner peripheral portion 64 adapted to engage the hard palate 66 of the patient 45 when the device 40 is in position in the mouth 44. This inner peripheral portion 64 serves as a tongue guide to help the patient 45 control movements of his tongue 52.

The electrode means 48 is connected to an electric potential producing means 68 by electrical circuit means 70 which may be conveniently cast into the support means 42 adjacent the inner peripheral edge 64. The electric potential means 68 comprises a plurality of 1.5 volt silver oxide batteries 72. Each battery 72 includes an encompassing sidewall 74, a top wall 76 and a bottom wall 78. The batteries 72 are connected together in series by placing the end 80 of the electrical circuit means 70 in electrical contact with the top wall 76 of a first battery 72a. A lead 82 connects the back wall 78 of the battery 72a to the back wall 78 of a second battery 72b which, in turn, is connected to a third battery 72c by a lead 84 having one end 86 in electrical contact with the top wall 76 of the battery 72b and a second end 88 in electrical contact with the top wall 76 of the battery 72c.

The electrode means 50 is connected to an electric potential means 90 by a suitable circuit means 92 having an end 94 connected to an individual battery 72a which, in turn, is connected in series to individual batteries 72b and 72c by leads identical to the lead 82 and 84 described above. The electric potential means 90 is connected to the electric potential means 68 by an electrical conductor 96 having an end 98 connected to the back wall 78 of the battery 72c forming a part of the electrical potential means 68 and an end 100 connected to the back wall, not shown, of the battery 72c in the electrical potential means 90.

Since the heat which would be necessary to solder the electrical connections to the batteries 72 would damage them, the circuit means 70, the leads 82 and 84 and the electrical conductor 96 are all maintained in electrical contact with associated batteries 72 by encasing the electrical potential means 68 and 90 in casing means 102 which is made of a heat shrinkable material, such as polyvinyl chloride biaxially oriented plastic film. The film may be heated sufficiently so that it shrinks tightly about the electric potential means 68 and 90 maintaining the circuit means 70, the leads 80 and 82 and the electrical conductor 96 in firm contact with their associated batteries 72.

After the casing means 102 has been installed, each electric potential means 68, 90 is encapsulated in an associated cheek-engaging member 104 which is positioned between the cheek 106 and the upper jaw 108 of the patient 45 when the device 40 is in position in his mouth 44. When so positioned, the electrical conductor 96 forms an arch in front of the upper teeth 46 for serving the dual functions of completing an electrical circuit to the electrodes means 48, 50 and of helping the patient overcome improper, upper lip functioning. The cheek-engaging portions 104 help the patient overcome any tendency to bite his cheeks 106 and also helps overcome compression effects in the buccinator muscles which sometimes accompanies improper functioning of the tongue.

The cheek-engaging portions 104 are each connected to the members 56 by a pair of wires 110 adapted to be clamped about the bicuspids 112 of the patient 45 when the device 40 is positioned in his mouth. When so positioned, the electrical circuit means 70 and 92 will pass behind the patient's posterior molars, not shown, at the base thereof. Each wire 110 includes a first end 114 which is cast into the cheek-engaging portion 104 and a second end 116 which is cast into the member 56.

The member 56 and the cheek pads 104 may be manufactured by employing well known dental molding techniques from well known dental plastics.

In use, when the patient's tongue 52 functions improperly by being moved to a predetermined improper position with the mouth 44 adjacent the upper teeth 46 where the electrode means 48, 50 are located, the tongue 52 will contact the electrode means completing a circuit through the electrode means 48, circuit means 70, electric potential means 68, electrical conductor 96, electric potential means 90, electric circuit means 92 and electrode means 50. This supplies approximately 9 volts of electricity to the tongue 52 from the electric potential means 68 and 90 causing an involuntary withdrawal of the tongue 52 from the predetermined, improper position.

While the particular devices for correcting tongue thrust problems herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. A device for correcting improper functioning of the tongue of a wearer of the device, said wearer having a mouth and upper teeth, comprising:

electrode means for imparting an electrical shock to said tongue when said tongue moves to a predetermined improper position within said mouth adjacent said upper teeth;

support means positionable in said mouth adjacent said upper teeth, said support means being connected to said electrode means for supporting said electrode means at said improper position;

means for producing an electric potential across said electrode means for imparting an electrical shock to said tongue when said tongue contacts said electrode means; and electrical circuit means connecting said electrode means to said electric potential means for supplying said electric potential across said electrode means.

2. A device as stated in claim 1 wherein said electrode means comprises a pair of spaced electrodes depending from said support means.

3. A device as stated in claim 1 wherein said support means comprises a full palate retainer.

4. A device as stated in claim 1 wherein a U-shaped member having an inner peripheral portion engaging said wearer's hard palate.

5. A device as stated in claim 1 wherein said electric potential producing means comprises a plurality of batteries connected together in series, said batteries being mounted in said support means.

6. A device as stated in claim 4 wherein said support means includes a pair of cheek-engaging portions connected to said U-shaped member.

7. A device as stated in claim 6 wherein said electric potential producing means comprises batteries mounted in each of said cheek-engaging portions.

8. A device as stated in claim 7 wherein said circuit means includes an electrical conductor forming an arch in front of said upper teeth when said device is positioned in said mouth, said conductor having one end connected to the batteries in one of said cheek-engaging portions and another end connnected to the batteries in the other of said cheek-engaging portions.

9. A device as stated in claim 8 wherein said circuit means also includes a first portion mounted in said U-shaped member, said first portion having one end connected to said electrode means and another end connected to the batteries in one of said cheek-engaging portions and a second portion mounted in said U-shaped member, said second portion having one end connected to said electrode means and another end connected to the batteries in the other of said cheek-engaging portions.

10. A device as stated in claim 9 wherein said electrode means comprises a first electrode connected to said one end of said first portion and a second electrode connected to said one end of said second portion, said first and second electrodes depending from said U-shaped member in spaced-apart relation.

References Cited by the Examiner

A Major Breakthrough in Tongue Thrust Problems, American Journal of Orthodontics, v. 51, page 26, February 1965, Sci. Library.

Orthodontics, Principles and Practice, T. M. Graber, page 565.

ADELE M. EAGER, *Primary Examiner.*